United States Patent
Huang

(12) United States Patent (10) Patent No.: US 6,226,381 B1
(45) Date of Patent: May 1, 2001

(54) TELEPHONE LINE BOX THAT PREVENTS TANGLES OF THE EXTENSION AND RETRACTION OF A CABLE

(75) Inventor: Wei-Chen Huang, Ping-Tung Hsien (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 09/250,025

(22) Filed: Feb. 11, 1999

(51) Int. Cl.$^7$ .................................................. H04M 1/00
(52) U.S. Cl. ............................................................. 379/438
(58) Field of Search .................................. 379/438, 447; 242/388.1, 395

(56) References Cited

U.S. PATENT DOCUMENTS 6,079,657 * 6/2000 Hwang ................................. 379/438

* cited by examiner

Primary Examiner—Jack Chiang

(74) Attorney, Agent, or Firm—Winston

(57) ABSTRACT

A telephone line box includes a telephone line, a housing and a cable chassis. The telephone line includes two telephone plugs and a belt-type cable connected between the two plugs. The housing includes a cylindrical slot in it, two openings located on one end of the housing for placing the two plugs, and one cable path between each of the openings and the cylindrical slot for allowing the cable to pass through. The cable chassis is rotatably positioned in the cylindrical slot of the housing having a disc and a reel installed at the center of the disc. The cable is divided into two parts separated by a middle portion that is fixed to the reel. When the cable chassis is rotated along a specific direction to collect the two parts of the cable through the two cable paths of the housing, the two parts of the cable will be wrapped around the reel through two neighboring entry positions in the cylindrical slot, and the two cable paths are arranged along two tangential directions extended from the two entry positions of the cylindrical slot. When one part of the cable is pulled out of the cylindrical slot along one cable path, the other part of the cable will be smoothly carried out through the other cable path in the same time without becoming tangled.

2 Claims, 5 Drawing Sheets

US 6,226,381 B1

TELEPHONE LINE BOX THAT PREVENTS TANGLES OF THE EXTENSION AND RETRACTION OF A CABLE

BACKGROUND OF THE INVENTION

1. Field of the Invention

The present invention relates to a telephone line box, and more particularly, to a telephone line box that prevents tangles of the extension and retraction of a cable.

2. Description of the Prior Art

A telephone line box is used for winding a telephone line around a spool to make it more convenient to carry. The telephone line box comprises two discs for winding the telephone line and a housing with two openings. The plugs of the telephone line are placed at the two openings. The two openings are commonly installed with one on the top side and the other on the bottom side. Alternatively, they may be both installed on the bottom side. In the former design, the housing is large and cumbersome. In the latter design, the housing is smaller but the telephone line very easily gets tangled.

Please refer to FIG. 1 and FIG. 2. FIG. 1 is a perspective view of a prior art telephone line box 10. FIG. 2 is a sectional view along line 2—2 of the telephone line box 10 shown in FIG. 1. The telephone line box 10 comprises a telephone line 12 with two plugs 14, a housing 18 comprising two openings 20, 21 on its bottom for placing the two plugs 14, and a cable chassis 22 rotatably installed in the housing 18. The cable chassis 22 comprises two corresponding discs 23 for winding the telephone line 12 and an reel 24 at the center of the two discs 23. The telephone line 12 is divided into two parts with its middle portion fixed to the reel 24.

When the cable chassis 22 is rotated along a specific direction to collect the two parts of the telephone line 12, the two parts of the telephone line 12 become rolled onto the reel 24 along two neighboring tangential positions 26, 28. When one of the plugs 14 is pulled out of an opening 20, 21, the cable chassis 22 rotates in an opposite direction such that the two parts of the telephone line 12 are pulled out separately along the two neighboring tangential positions 26, 28. As shown in FIG. 2, the distance between the tangential position 28 and the opening 20 is longer than the distance between the tangential position 26 and the opening 21 such that when one part of the telephone line 12 is pulled outward, the telephone line 12 may easily become tangled at this portion.

SUMMARY OF THE INVENTION

It is therefore a primary objective of the present invention to provide a telephone line box for solving the above mentioned problems.

In a preferred embodiment, the present invention provides a telephone line box comprising:

- a telephone line comprising two telephone plugs and a belt-type cable connected between the two plugs;
- a housing comprising a cylindrical slot in it, two openings located on one end of the housing for placing the two plugs, and one cable path between each of the openings and the cylindrical slot for allowing the cable to pass through; and
- a cable chassis rotatably positioned in the cylindrical slot of the housing comprising a disc and a reel installed at the center of the disc, the cable being divided into two parts separated by a middle portion that is fixed to the reel;

wherein when the cable chassis is rotated along a specific direction to collect the two parts of the cable through the two cable paths of the housing, the two parts of the cable will be wrapped around the reel through two neighboring entry positions in the cylindrical slot, and the two cable paths are arranged along two tangential directions extended from the two entry positions of the cylindrical slot wherein when one part of the cable is pulled out of the cylindrical slot along one cable path, the other part of the cable will be smoothly carried out through the other cable path in the same time without becoming tangled.

It is an advantage of the present invention that the cable can be pulled out without becoming tangled while the volume of the box is effectively reduced. Also, the box can accommodate a longer cable and only requires one disc thus reducing costs.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
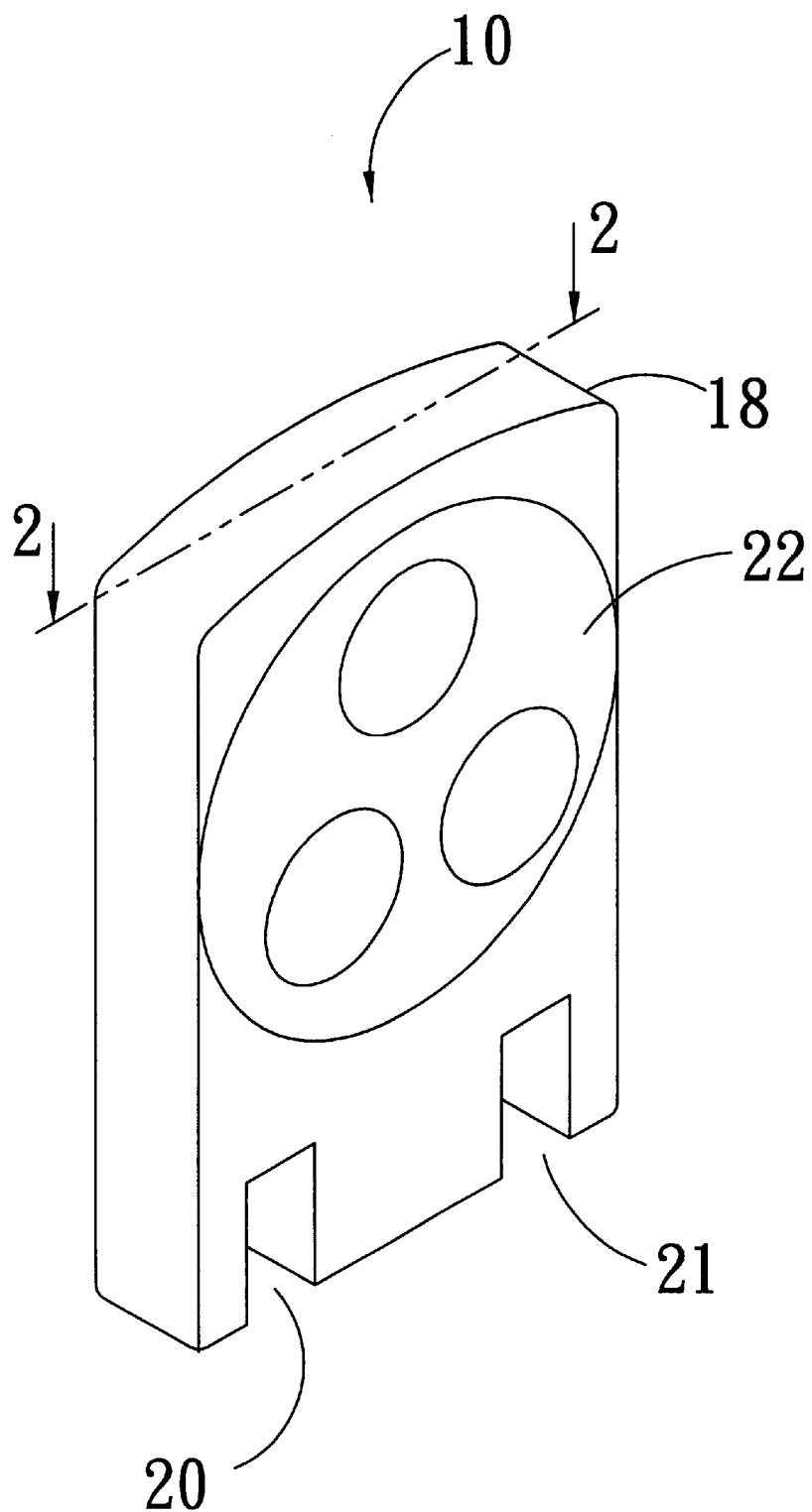
FIG. 1 is a perspective view of a prior art telephone line box.
Figure 2:
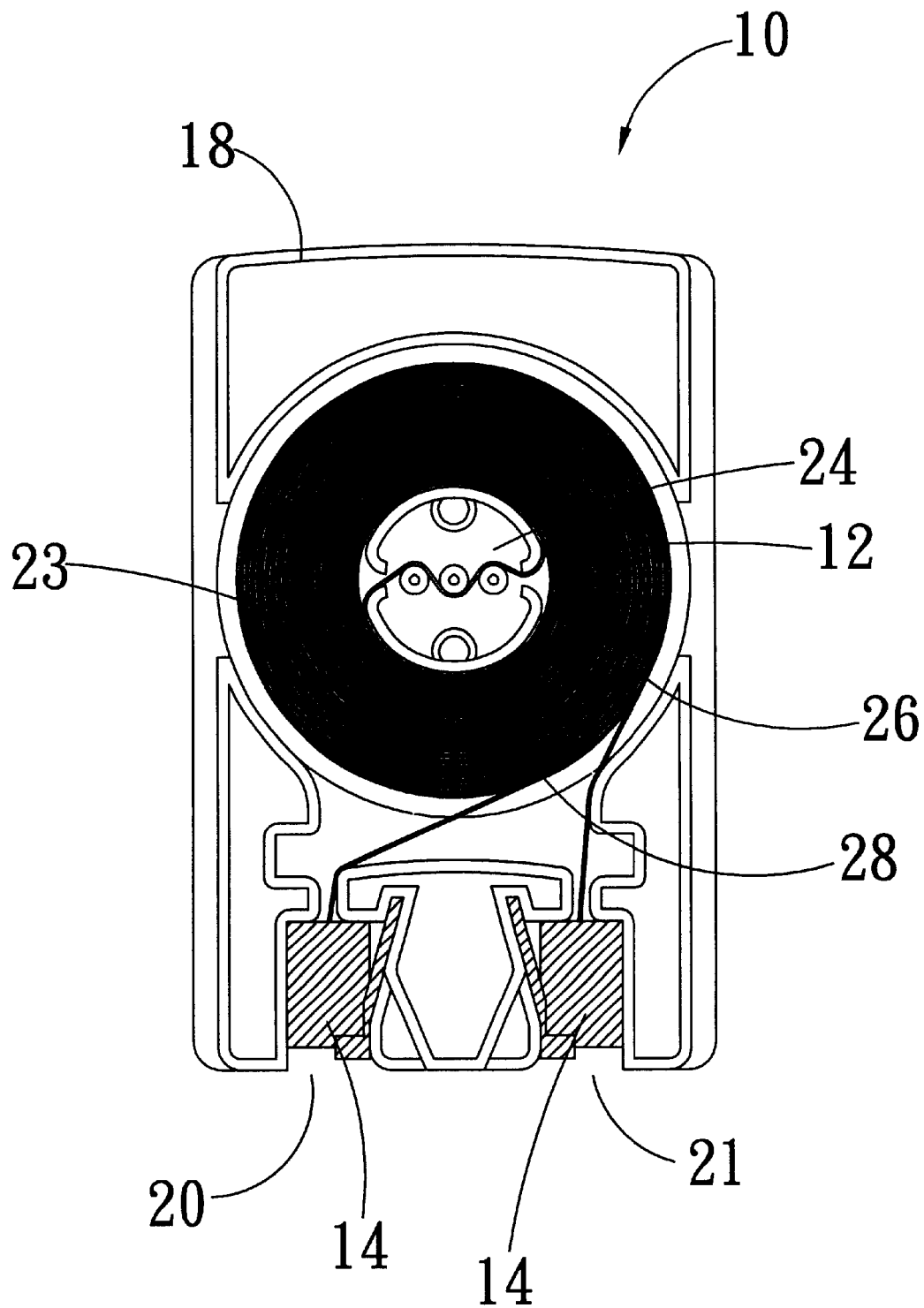
FIG. 2 is a sectional view along line 2—2 of the telephone line box shown in FIG. 1.
Figure 3:
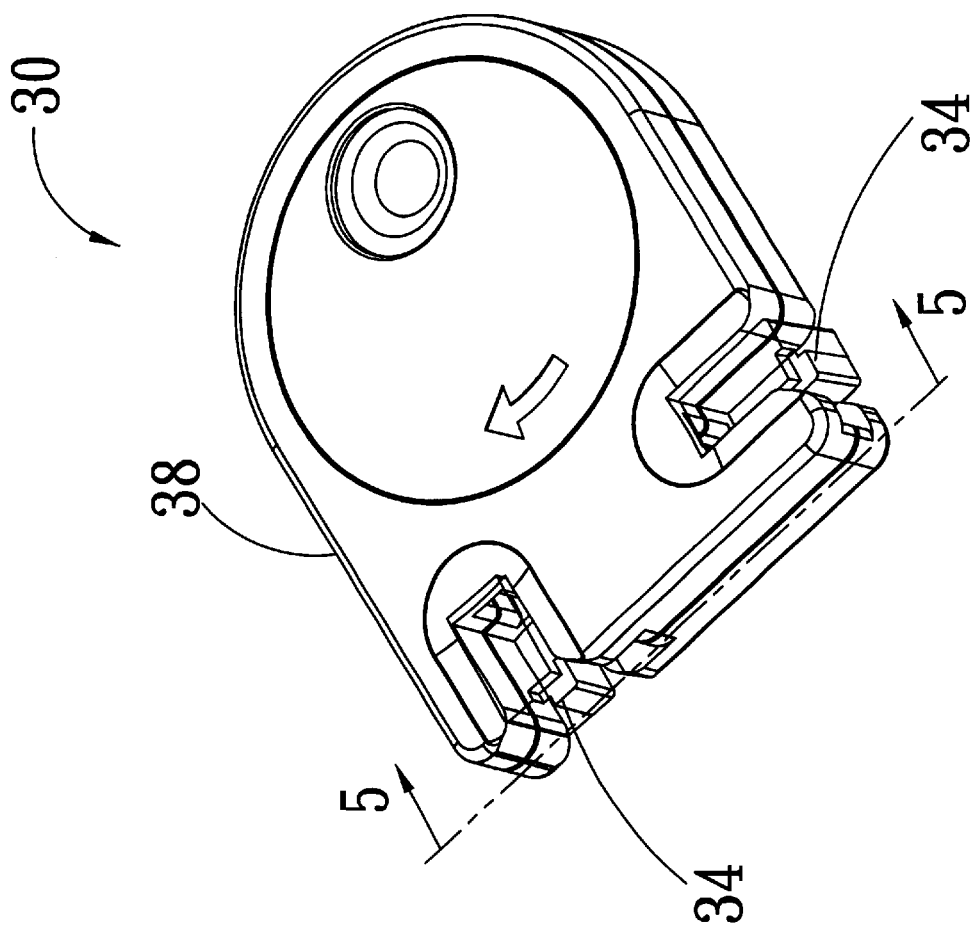
FIG. 3 is a perspective view of a telephone line box according to the present invention.
Figure 4:
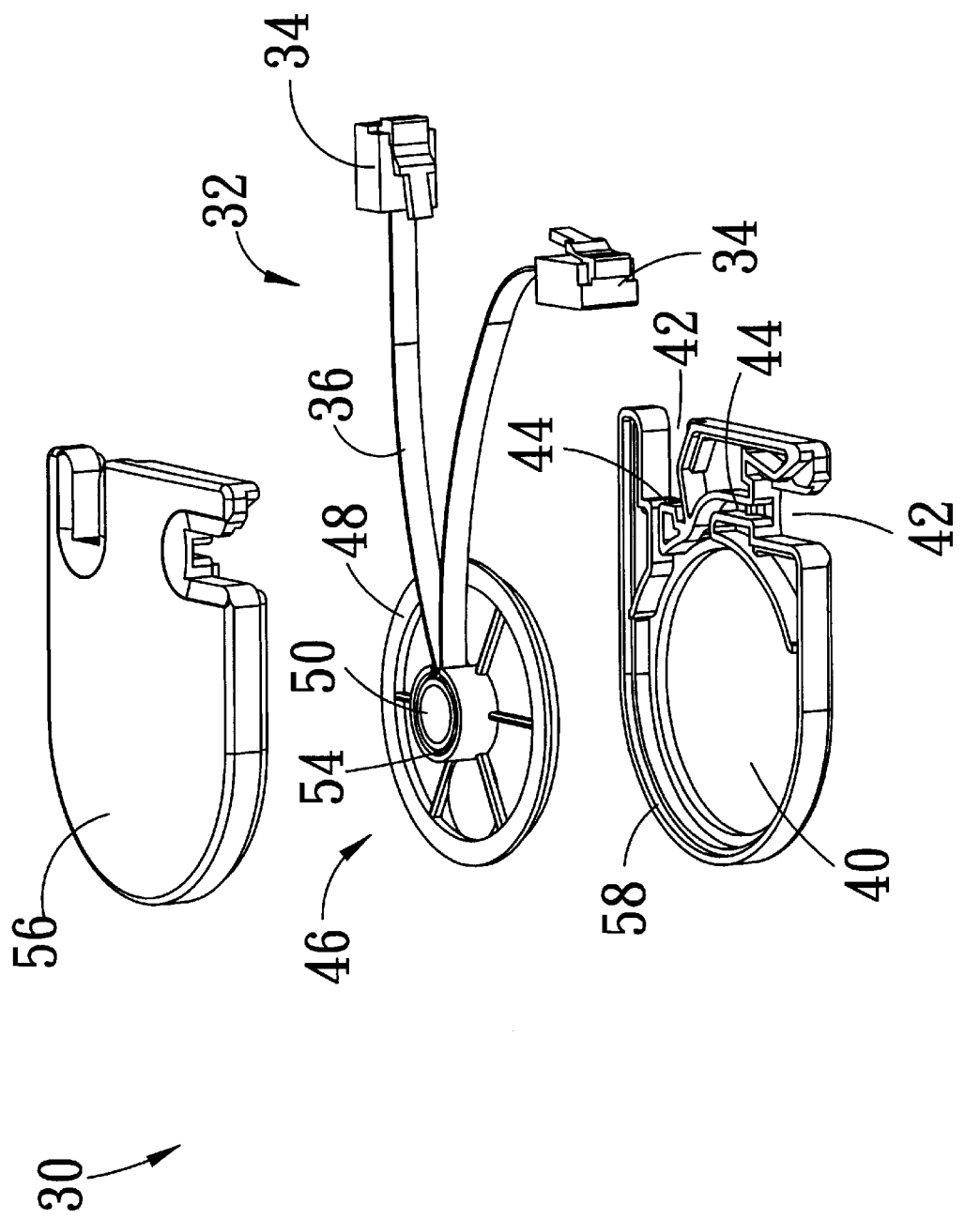
FIG. 4 is a component diagram of the telephone line box shown in FIG. 3.

Please refer to FIG. 3 and FIG. 4. FIG. 3 is a perspective view of a telephone line box 30 according to the present invention. FIG. 4 is a component diagram of the telephone line box 30 shown in FIG. 3. The telephone line box 30 comprises a telephone line 32, a housing 38 and a cable chassis 46. The telephone line 32 comprises two telephone plugs 34 and a belt-type cable 36 connected between the two plugs 34. The housing 38 comprises an upper housing 56 and a lower housing 58. The upper housing 56 has a holding slot (not shown), and the lower housing 58 has a cylindrical slot 40 and two openings 42 at two ends of the cylindrical slot 40 for placing the two plugs 34. The housing 38 further comprises one cable path 44 between each of the openings 42 and the cylindrical slot 40 for allowing the cable 36 to pass through. The cable chassis 46 is rotatably positioned in the cylindrical slot 40 of the housing 38. It comprises a disc 48 and a reel 50 installed at the center of the disc 48. The reel 50 is anchored by the holding rim of the upper housing and comprises a C-shaped rim 54 with one opening. The cable 36 is divided into two parts separated by a middle portion that is fixed to the C-shaped rim 54. The two parts of the cable 36 extend from the opening of the C-shaped rim 54.

Figure 5:
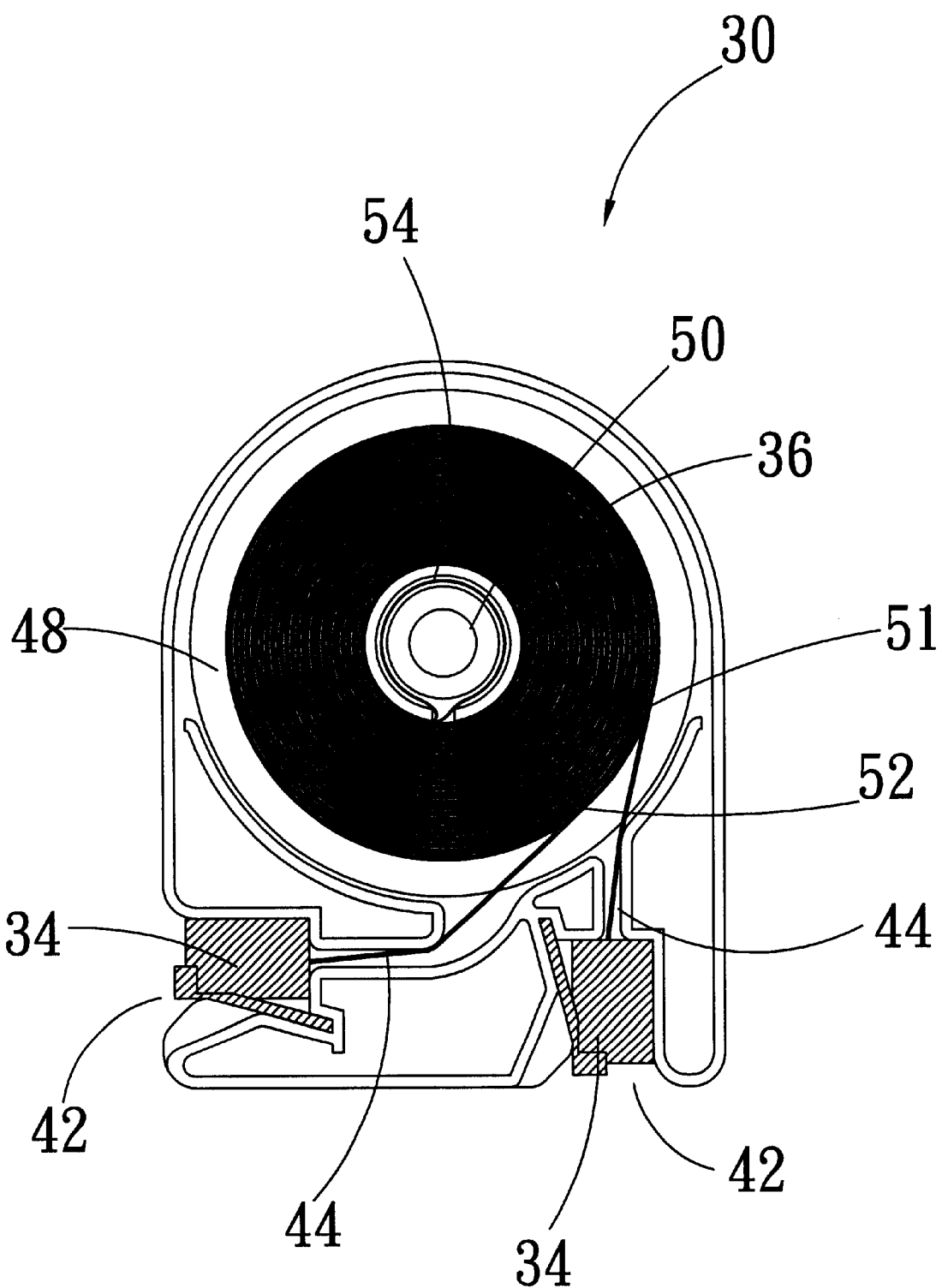
FIG. 5 is a sectional view along line 5—5 of the telephone line box shown in FIG. 3.

Please refer to FIG. 5. FIG. 5 is a sectional view along line 5—5 of the telephone line box 30 shown in FIG. 3. When the disc 48 is rotated along a specific direction to collect the two parts of the cable 36 through the two cable paths 44 of the housing 38, the two parts of the cable 36 will be wrapped around the reel 50 through two neighboring entry positions 51, 52 in the cylindrical rim 40. The two cable paths 44 are arranged along two tangential directions extended from the two entry positions 51, 52 of the cylindrical slot 40. When one part of the cable 36 is pulled out of the cylindrical rim 40 along one cable path 44, the other part of the cable 36 will be smoothly carried out through the other cable path 44 in the same time without becoming tangled.

In contrast to the prior art telephone line box 10 the telephone line box 30 of the present invention has two cable paths 44 installed in such a way that they extend outward in an approximate tangential direction from the two tangential positions 51, 52. In this way, the cable 36 can be pulled out in an approximate straight line through the cable paths 44 without becoming tangled. Additionally, the installation of the opening 42 in the present invention more efficiently utilizes space in the housing 38, so the volume of the box can be effectively reduced thus increasing portability. An added benefit is that a longer cable can be accommodated. Finally, the chassis 46 of the present invention only needs one disc 48 so the costs can be reduced.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A telephone line box comprising:

a telephone line comprising two telephone plugs and a belt-type cable connected between the two plugs;

a housing comprising a cylindrical slot in it, two openings located on one end of the housing for placing the two plugs, and one cable path between each of the openings and the cylindrical slot for allowing the cable to pass through; and a cable chassis rotatably positioned in the cylindrical slot of the housing comprising a disc and a reel installed at the center of the disc, the reel comprising a C-shaped rim having only a single opening, the cable being divided into two parts separated by a middle portion that is fixed inside the C-shaped rim through the opening of the C-shaped rim;

wherein when the cable chassis is rotated along a specific direction to collect the two parts of the cable through the two cable paths of the housing, the two parts of the cable will be wrapped around the reel through two neighboring entry positions in the cylindrical slot, and the two cable paths are arranged along two tangential directions extended from the two entry positions of the cylindrical slot wherein when one part of the cable is pulled out of the cylindrical slot along one cable path, the other part of the cable will be smoothly carried out through the other cable path in the same time without becoming tangled.

2. The telephone line box of claim 1 wherein the housing comprises an upper housing and a lower housing, and the upper housing has a holding slot for rotatably holding the reel of the cable chassis, and the lower housing comprises a cylindrical recess defining part of the cylindrical slot for loading the disc of the cable chassis.

* * * * *